US012268278B2

(12) United States Patent
Folsom et al.

(10) Patent No.: US 12,268,278 B2
(45) Date of Patent: Apr. 8, 2025

(54) SYSTEM AND METHODS FOR LASTING AN UPPER TO A 3D PRINTED PLATFORM

(71) Applicant: HILOS, INC., Portland, OR (US)

(72) Inventors: Eric Folsom, Portland, OR (US); Gaia Giladi, Portland, OR (US); Elias Stahl, Portland, OR (US)

(73) Assignee: HILOS, Inc., Portland, OR (US)

( * ) Notice: Subject to any disclaimer, the term of this patent is extended or adjusted under 35 U.S.C. 154(b) by 600 days.

(21) Appl. No.: 17/238,584

(22) Filed: Apr. 23, 2021

(65) Prior Publication Data

US 2021/0330030 A1 Oct. 28, 2021

Related U.S. Application Data

(60) Provisional application No. 63/015,214, filed on Apr. 24, 2020.

(51) Int. Cl.

| | |
|---|---|
| ***A43B 13/37*** | (2006.01) |
| ***A43B 13/18*** | (2006.01) |
| ***A43B 13/38*** | (2006.01) |
| ***A43B 23/02*** | (2006.01) |
| *B33Y 80/00* | (2015.01) |

(52) U.S. Cl.

CPC ............ *A43B 13/37* (2013.01); *A43B 13/181* (2013.01); *A43B 13/38* (2013.01); *A43B 23/025* (2013.01); *B33Y 80/00* (2014.12)

(58) Field of Classification Search

CPC ....... A43B 13/37; A43B 13/181; A43B 13/38; A43B 23/025

USPC .......................................................... 36/24.5

See application file for complete search history.

(56) References Cited

U.S. PATENT DOCUMENTS 2,438,711 A * 3/1948 Leach .................... A43B 3/244 36/12
2,552,943 A * 5/1951 Danielius ................ A43B 3/24 36/15
4,041,618 A 8/1977 Famolare, Jr.

(Continued)

FOREIGN PATENT DOCUMENTS

JP 2015512324 A 4/2015
WO WO2018073417 A1 * 4/2018

OTHER PUBLICATIONS

EPO, Extended European Search Report, EP Patent Application 21793771.3, mailed Sep. 12, 2023, 9 pages.

(Continued)

*Primary Examiner* — Alissa J Tompkins
*Assistant Examiner* — Catherine M Ferreira
(74) *Attorney, Agent, or Firm* — Perkins Coie LLP

(57) ABSTRACT

The present disclosure relates to a platform for footwear. The platform includes bevels and an internal channel for assembling an upper with the platform. A first bevel is defined in a first side portion of the platform and is configured to receive a portion of a first upper side. A second bevel is defined in a second side portion of the platform and is configured to receive a portion of a second upper side. An internal channel is positioned within the platform and extends between the first bevel and the second bevel. The internal channel is configured to receive a fastener to assemble the upper with the platform. The platform may also include a slot for receiving an edge portion of a sock liner to assemble the sock liner with the platform.

17 Claims, 13 Drawing Sheets

(56) References Cited

U.S. PATENT DOCUMENTS

| | | | | |
|---|---|---|---|---|
| 4,439,935 | A | 4/1984 | Kelly | |
| 5,317,822 | A | 6/1994 | Johnson | |
| 5,625,965 | A | 5/1997 | Blissett et al. | |
| 8,307,570 | B2 | 11/2012 | Delgatty | |
| 9,681,703 | B2 | 6/2017 | Cross | |
| 10,010,133 | B2 | 7/2018 | Guyan | |
| 10,271,612 | B2 | 4/2019 | Zake | |
| 10,702,012 | B2 * | 7/2020 | Guyan | A43B 13/181 |
| 2005/0055844 | A1 * | 3/2005 | Yu | A43B 13/36<br>36/19 R |
| 2006/0117605 | A1 | 6/2006 | Michaeli | |
| 2006/0218820 | A1 * | 10/2006 | Baden | A43B 21/025<br>36/34 R |
| 2008/0289214 | A1 * | 11/2008 | Aveni | A43B 3/06<br>36/12 |
| 2013/0104422 | A1 * | 5/2013 | Hatfield | |
| 2015/0289581 | A1 * | 10/2015 | Sussmann | A43B 13/12<br>36/114 |
| 2017/0119092 | A1 | 5/2017 | Lee-Sang | |
| 2018/0289107 | A1 * | 10/2018 | Guyan | A43B 13/186 |
| 2018/0295933 | A1 | 10/2018 | Davis et al. | |
| 2019/0184629 | A1 | 6/2019 | Kerrigan | |
| 2020/0046062 | A1 | 2/2020 | Perillo et al. | |

OTHER PUBLICATIONS

International Search Report and Written Opinion for related International Application No. PCT/US2021/028859; action dated Jul. 27, 2021; (9 pages).

* cited by examiner

SYSTEM AND METHODS FOR LASTING AN UPPER TO A 3D PRINTED PLATFORM

PRIORITY CLAIM

The present application claims priority to and the benefit of U.S. Provisional Application 63/015,214, filed Apr. 24, 2020, the entirety of which is herein incorporated by reference.

BACKGROUND

Typically, footwear is assembled by bonding or affixing several separate layers together (e.g., insole, midsole, outsole) to form a sole and an upper that is affixed to these several layers by relying on the layering method. An upper covers the top and sides of the user's foot and the sole covers the bottom of the user's foot and makes contact with the ground. The sole typically includes an insole, a midsole, and an outsole which cushion and protect the user's foot while the user makes contact with the ground. The insole is responsible for comfort and support, the outsole for grip, durability, and weather-proofing, actually coming into contact with the ground, and the midsole is arranged between the insole and the outsole for structural support, balance, and performance attributes. An outsole may also include a heel positioned under where a user's heel is when wearing the shoe.

Typically, a sock liner is the finished material that is in contact directly with the human foot. Underneath it are several layers of material that provide both the requisite rebound and flexibility near the foot (insole and lining materials) as well as structure and support beneath it (midsole and shank). Due to this layered construction, sock liners are traditionally wrapped around the uppermost layer of lining material (commonly urethane foams, cork, etc.) and this wrapped insole with liner is then cemented to a midsole.

The upper and/or sock liner can be made from various materials, for example leather, different fabrics and textiles and/or synthetic materials. A sole is typically made from hardwearing materials, e.g. rubber, wood, or hardwearing synthetic materials.

The upper and the sole components and/or parts thereof can be attached together during manufacture or after manufacturing. In some arrangements, a shoe is assembled through assembly/fastening methods such as studs, nails, fasteners and string lasting from the upper to the outsole. In other arrangements, the shoe is assembled through layering. For example, the upper may be attached between the midsole and outsole or midsole and insole to couple the sole and the upper. Customarily, the shoe lasting is the shoemaking operation that sets the final shape of a shoe and holds it in place so the outsole can be permanently attached.

SUMMARY

The present application provides a new and innovative platform and method for footwear assembly. In an example, a platform includes a first surface configured to contact a user foot. A second surface is opposite of the first surface and contacts the ground. A first side portion extends between the first surface and the second surface. A second side surface portion extends between the first surface and the second surface. The second surface is opposite the first side portion. A first bevel is defined in the first side portion and is configured to receive a portion of a first upper side. A second bevel is defined in the second side portion and is configured to receive a portion of a second upper side. An internal channel is positioned between and internal of the first surface and the second surface and extends between the first bevel and the second bevel. The internal channel is configured to receive a fastener to assemble an upper with the platform.

In another example, a method of assembling issue includes inserting a fastener through a first fastener channel on a first side of a lower portion of an upper; inserting the fastener into a first bevel defined in a first side portion of a platform, through a first loop portion of an internal channel of the platform, and out of a second bevel defined in a second side portion of the platform; inserting the fastener through a second fastener channel on a second side of the lower portion of the upper; inserting the fastener into the second bevel, through the first loop portion and a second loop portion of the internal channel, and out of the first bevel; inserting the fastener through a third fastener channel on a first side of an upper portion of the upper; inserting the fastener into the first bevel, through the second loop portion of the internal channel, and out of the second bevel; inserting the fastener through a fourth fastener channel on a second side of the upper portion of the upper; inserting the fastener into the second bevel, through the second loop portion and a central loop portion of the internal channel, and out of a cavity in the platform; and tensioning the fastener to thereby string last the upper to the platform.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Referring to the figures generally, a shoe including an upper and a 3D printed platform with a midsole portion having an internal channel and a heel portion is described. The present disclosure provides for attachment of the upper to the internal channel of the midsole portion without bonds or fixtures through a fastening member. In various embodiments, the fastening member is a string implemented in string lasting the upper and the platform. For purposes of simplicity, the term "shoe," as used herein, is meant to include shoes, sneakers, boots, heels, flats, dress shoes, sandals, slippers, athletic footwear, and other items of footwear, i.e., items of a form or type suitable for positioning on a human foot. Additionally, for purposes of simplicity, the term "3D printed," as used herein, is meant to include additive manufacturing, additive fabrication, the printing process of generating an item by successively adding material layer by layer, and other printing processes in which material is joined or solidified under computer control to create a three-dimensional object.

Various embodiments include a shoe platform that is 3D printed with the midsole having at least one internal channel and at least one bevel or opening along a side of the midsole portion. The platform includes the midsole and heel portion formed or printed as a single unit. In some embodiments, the platform includes just the midsole portion. In various embodiments, a bevel is positioned on each side of the midsole and is configured to receive a portion of the upper. In some embodiments, a bevel is defined on a front portion and/or rear portion of the midsole. An internal channel is defined within the midsole portion of the platform and places each bevel in communication with one another. The internal channel is configured to facilitate the coupling of the upper with the platform, by way of the midsole portion, during lasting. In some embodiments, the internal channel has a "Figure 8" shape to place an upper portion and lower portion of one side of the bevel with an upper portion and lower portion of another side of the bevel. In some embodiments, a window portion is defined in a ground side of the midsole and adjacent a substantially central portion of the internal channel.

Various embodiments include an upper that is configured to be received by the bevel(s) of the platform. The upper is precisely patterned to allow the proper fit and form around the bends of the bevel and/or internal channel of the midsole portion of the platform. In some embodiments, the pattern of the upper has several cuts to provide allowance before a binder is sewn onto its backing to create room for a string channel. In various embodiments, the upper is a fabric that covers the top and sides of the user's foot and may be open toed (e.g., user's toes are exposed) or closed toed (e.g., user's toes are covered).

Figure 1:
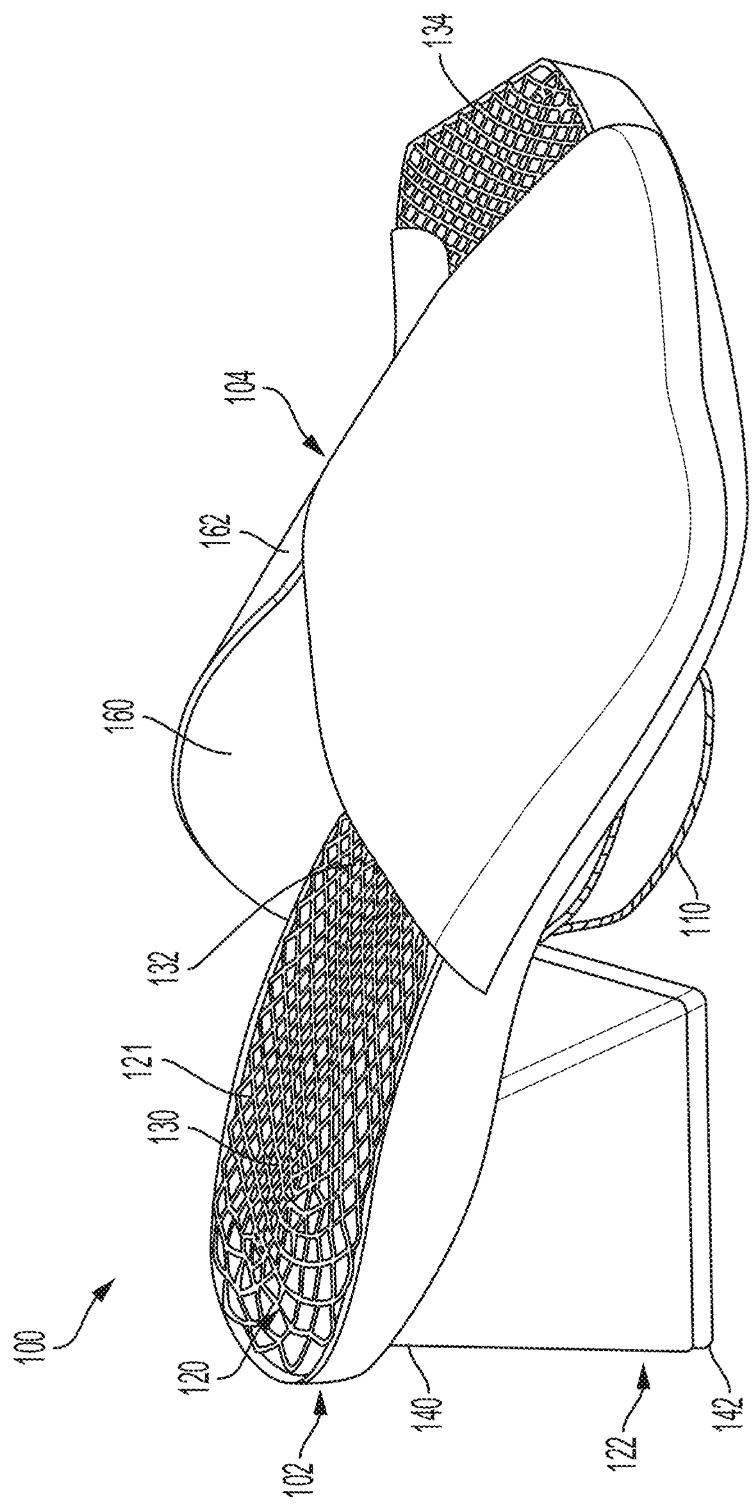
FIG. 1 illustrates a perspective view of a shoe including a 3D printed platform assembled with an upper, according to an example embodiment of the present application.

Referring to FIG. 1, a perspective view of an assembled shoe 100 that includes an upper 104 and a 3D printed platform 102 with a midsole portion 120 having an internal channel 150 (as shown in FIGS. 2A and 3A-3C) coupled by a string 110 is shown, according to an example embodiment. In some embodiments, the string 110 is a fastening member that is configured to couple the upper 104 to the platform 102 by way of the internal channels 150 of the platform 102. The upper 104 includes an internal surface 160 that contacts a user's foot and an external surface 162.

The platform 102 includes a midsole 120 and a heel 122 formed as a single unit. Stated differently, the platform 102 is a single integral component The heel 122 includes a first end 140 adjacent to, and formed with, a portion of the midsole 120 and a second end 162 adjacent the ground. The midsole 120 includes an upper portion 130, a middle portion 132, and a lower portion 134. The upper portion 130 is adjacent to, and formed with, the heel 122. The lower portion 134 is positioned near a user's toes when the user's foot is placed in the shoe 100. The middle portion 132 is a substantially angled portion between the upper portion 130 and the lower portion 134.

Figure 2A:
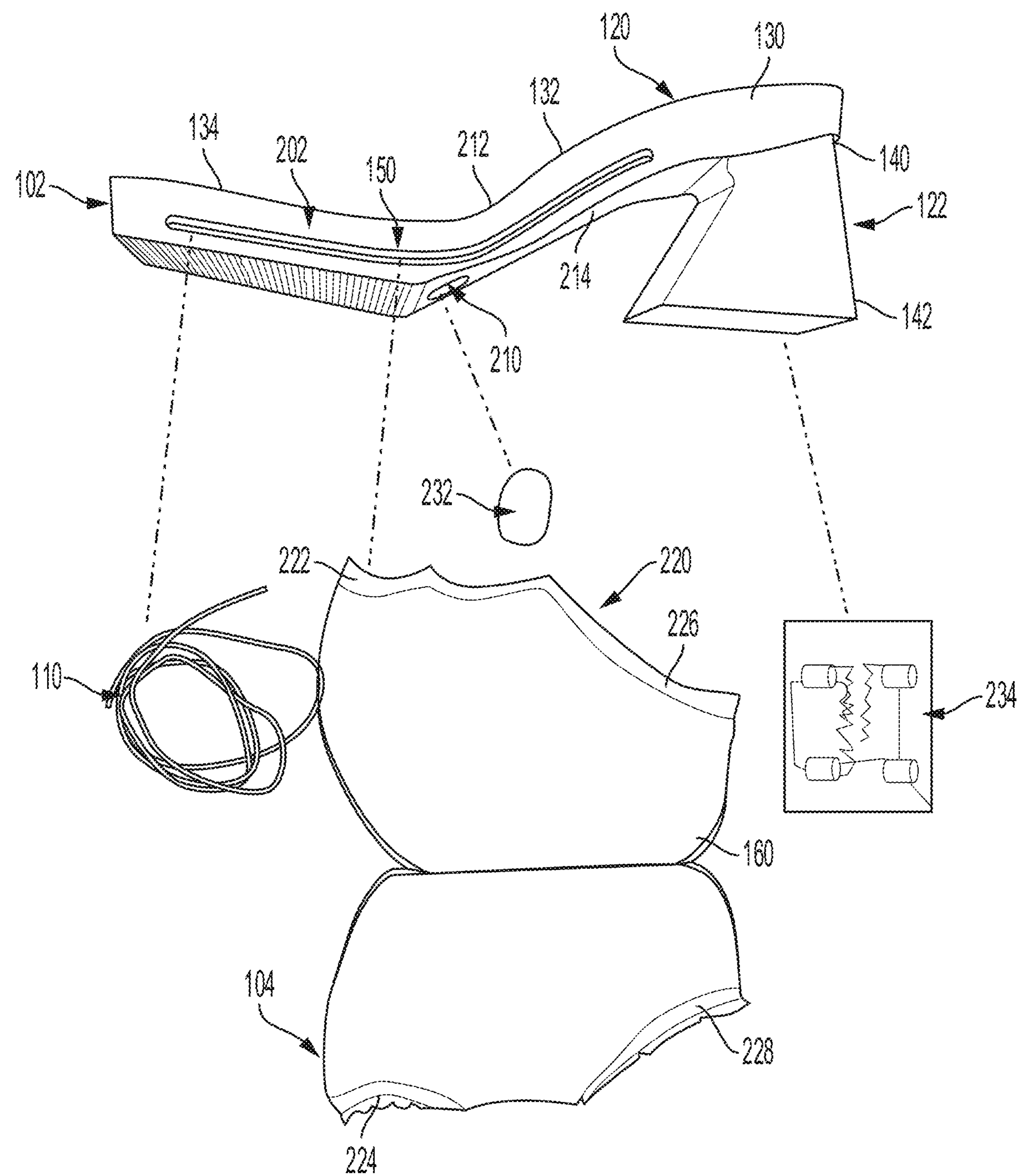
FIG. 2A illustrates a perspective view of an unassembled shoe of FIG. 1 including a side view of the 3D printed platform, an internal surface of the upper, a string, a heel cover, and a window cover.
Figure 2B:
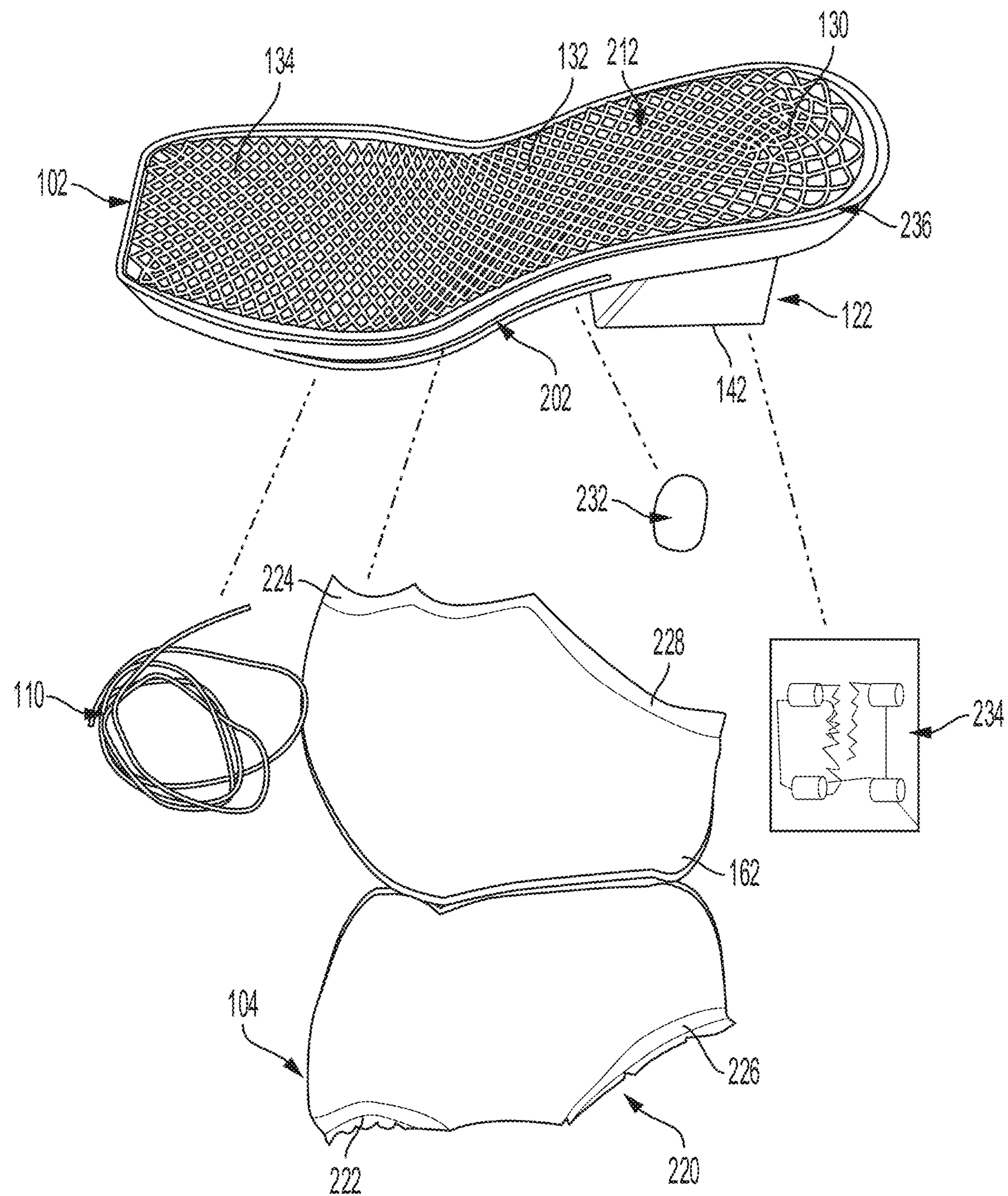
FIG. 2B illustrates a perspective view of the unassembled shoe of FIG. 2A illustrating an external surface of the upper and a midsole portion of the platform.

Turning to FIGS. 2A and 2B, the shoe 100 of FIG. 1 is shown in an unassembled state. As shown in FIG. 2A, the internal surface 160 of the upper 104 includes plurality of binders 220 that define string channels that are configured to receive the string 110 during assembly of the upper 104 and the platform 120. A first string channel 226 and a second string channel 228 are positioned on a lower side (e.g., positioned closer to the toe portion than the heel) of the upper 104. A third string channel 222 and a fourth string channel 224 are positioned on an upper side (e.g., positioned closer to the heel than the toe portion) of the upper 104.

As described in greater detail below, when the upper 104 is assembled and positioned within the bevels 202 of the platform 102 the third string channel 222 and the first string channel 226 are positioned in a first side bevel 312 (e.g., outstep side) (FIG. 3A) of the platform 102 and the fourth string channel 224 and the second string channel 228 are positioned in a second side bevel 302 (e.g., instep side) (FIG. 3C) of the platform 102. As shown in FIG. 2B, the external surface 162 of upper 104 has a sewn pattern for the plurality of binder 220, which is tucked and positioned within the bevels 202 when the upper 104 is assembled with the platform 102. The upper 104 is described in further detail below, in FIGS. 4 and 5.

In some embodiments, a heel plug 234 may be coupled onto the second end 142 of the heel 122. The heel plug 234 is configured to facilitate effective contact between the heel 122 of the shoe 100 and the ground. In such embodiments, the heel plug 234 may be inserted into one or more cavities defined in the second end 142. In some embodiments, the heel 122 does not include a heel plug 234. In some aspects, the heel 122 may be a substantially flat protrusion on the heel portion of the platform 102. In other aspects, the heel 122 may be a plurality of insertions along the platform 102, for example, studs, spikes, or other features.

The platform 102 includes the midsole 120 and the heel 122 formed as a single unit through 3D printing. In some embodiments, only the midsole portion 120 with an internal channel 150 is present. The midsole 120 portion has a foot side 212 (e.g., a first side that contacts the user's foot) and a ground side 214 (e.g., the second side facing the ground) positioned opposite of (e.g., axially away from) the foot side 212. The foot side 212 of the midsole 120 can include material formed in a lattice structure 121 (FIG. 1). A window cavity 210 is defined on the ground side 214 of the middle portion 132 of the midsole. The window cavity 210 is configured to facilitate the string lasting of the upper 104 and the platform 102. In some embodiments, the window cavity 210 is such that the string 110 is able to be pulled therethrough to tighten the upper 104 within the platform 102. In some embodiments, a window plug 232 may be inserted into the window cavity 210 to protect the string 110 in the internal channel 150. In other embodiments, the window plug 232 is not used.

The platform 102 includes bevels 202 on both sides of the midsole 120. The sides of the midsole 120 are positioned between the foot side 212 and the ground side 214 of the midsole 120. While the bevels 202 are shown along the right and left side of the midsole 102, in other embodiments, the front and/or rear portion may include a bevel. In those embodiments, the bevel positioned along the front and/or rear may form a continuous channel/bevel with the bevels on the right and/or left side of the midsole 102.

In at least some aspects, the platform 102 may include a slot 236. The slot 236 may extend around the entire platform 102 at an outer perimeter of the platform. The slot 236 is described in more detail below in connection with FIG. 6.

Figure 3A:
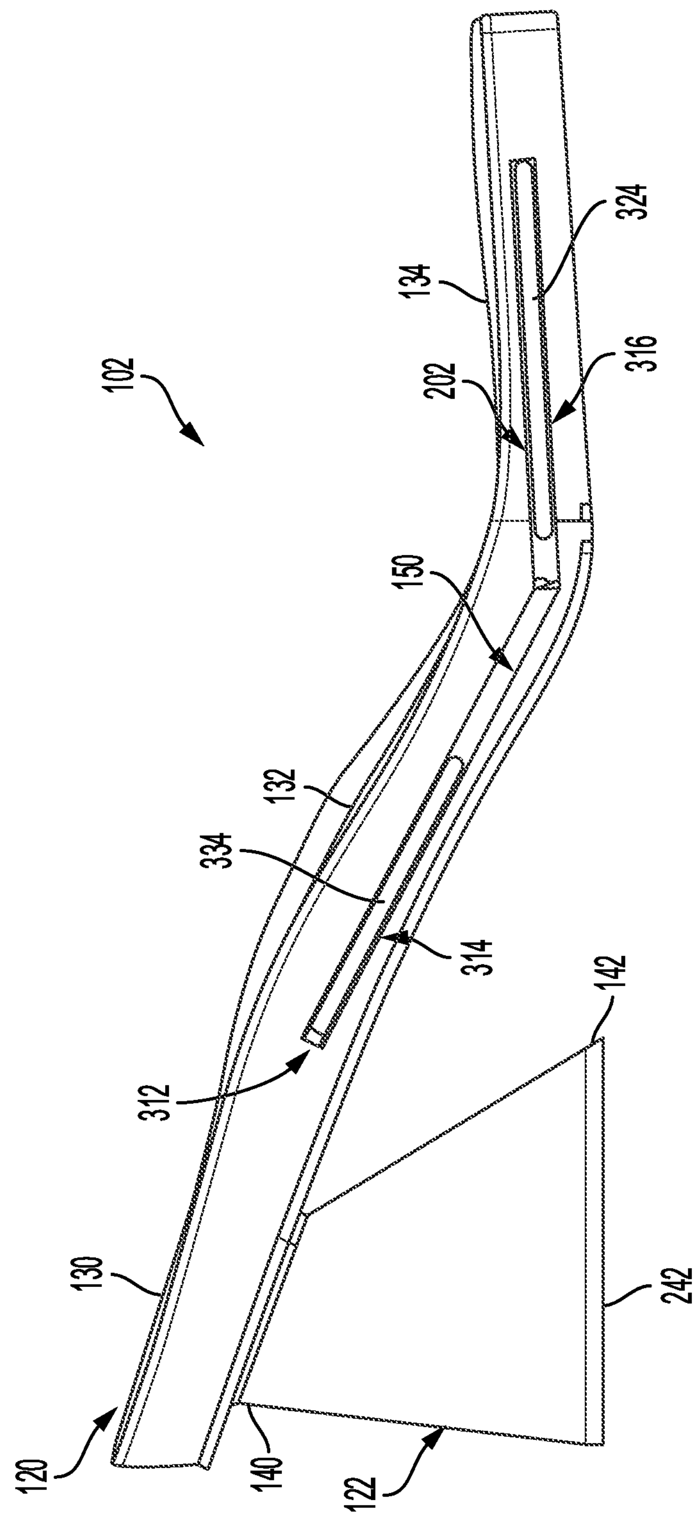
FIG. 3A illustrates a side view of the platform of the shoe of FIG. 2A, according to an example embodiment of the present application.
Figure 3B:
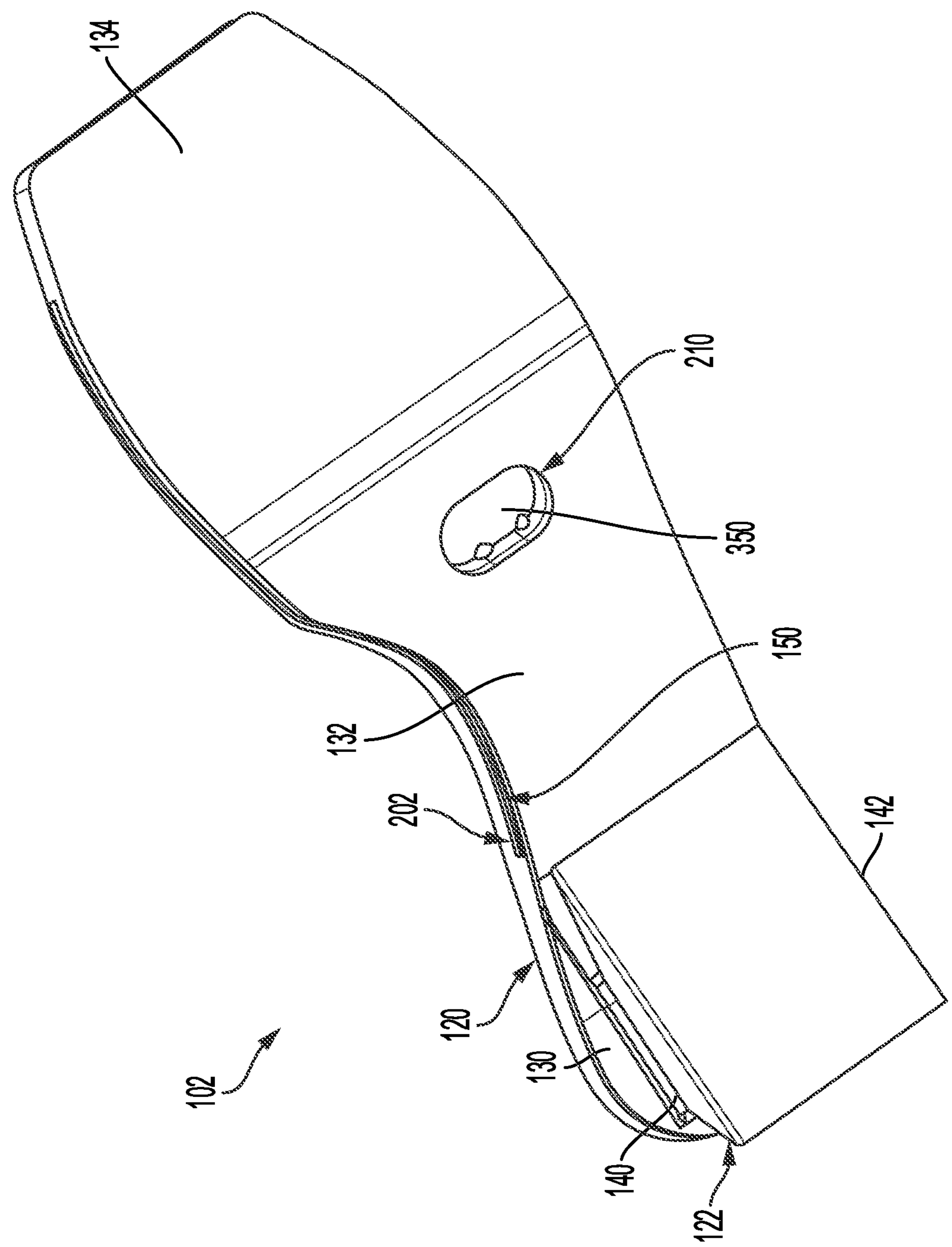
FIG. 3B illustrates a bottom perspective view of the platform of FIG. 3A.
Figure 3C:
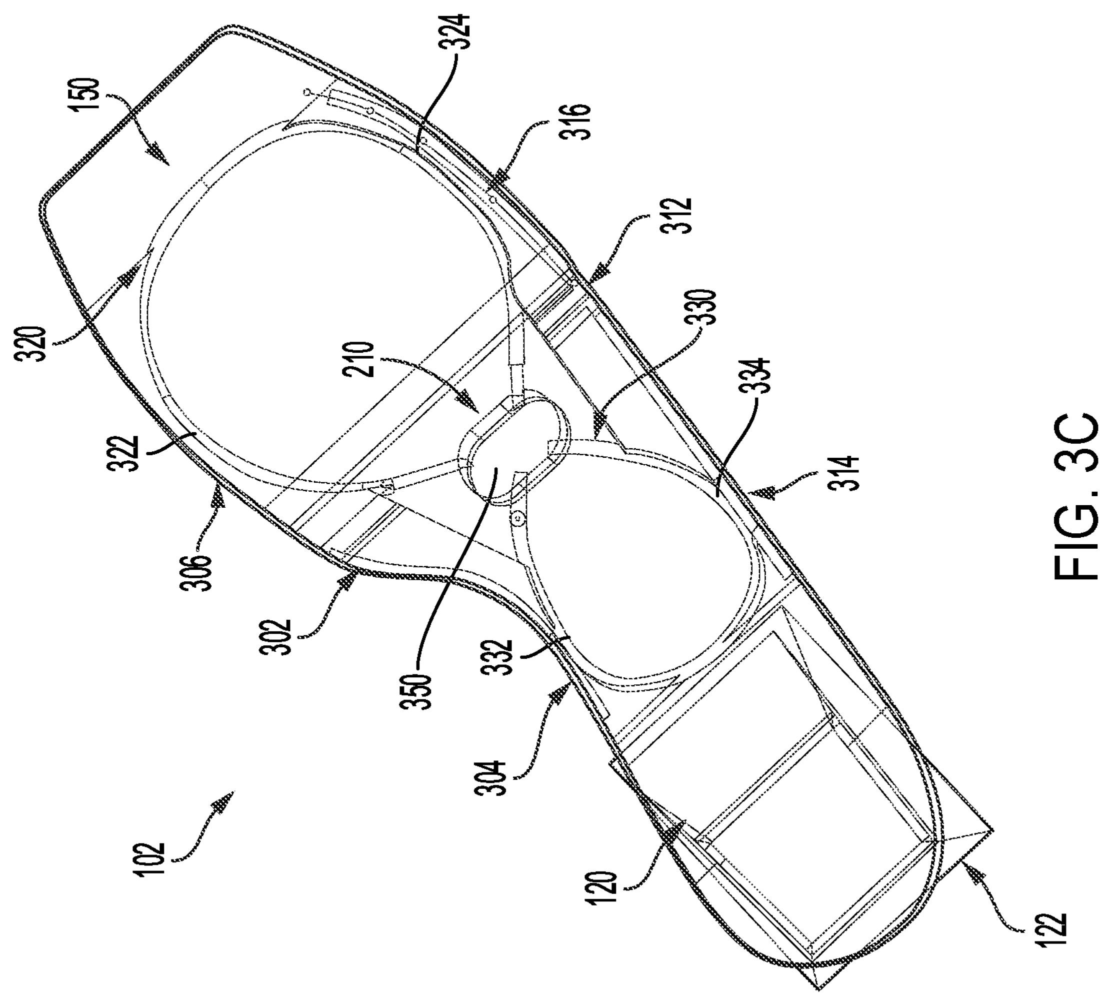
FIG. 3C illustrates a translucent, bottom perspective view of the platform of FIG. 3A.

Referring to FIG. 3A-3C, the platform 102 is 3D printed with an internal channel 150 that is configured to allow the upper 104 to be string lasted to the midsole 120 and held together without additional layers, bonds, or fixtures. As shown in the translucent view of the platform 102 in FIG. 3C, the internal channel 150, in this example, is a single channel running through its midfoot and forefoot section to form a "figure eight" shape. As will be appreciated, in other examples, the 3D printing of the platform 102 may be altered to define a single internal channel 150 having a wide variety of suitable shapes. In other embodiments, the internal channel 150 has a shape that abuts and extends along the bevels of the midsole portion 120. As shown in FIG. 3C, the platform 102 does not include a shank. In some embodiments, a shank or similar supportive structure may be positioned within the platform 102 or between the platform 102 and an external component.

The internal channel 150 includes an upper loop portion 330 and a lower loop portion 320. A center channel portion 350 positioned between the upper loop portion 330 and the lower loop portion 320. The lower loop portion 320 is defined by a first lower side portion 324 (e.g., outstep side, left side of the left shoe, etc.) and a second lower side portion 322 (e.g., instep side, right side of the right shoe, etc.). The upper loop portion 330 is defined by a first upper side portion 334 (e.g., outstep side, left side of the left shoe, etc.) and a second upper side portion 332 (e.g., instep side, right side of the right shoe, etc.). As shown in FIG. 3C, the lower loop portion 320 has a wider circular shape compared to the upper loop portion 330.

Each of the upper loop portion 330 and the lower loop portion 320 are accessible to an outside of the platform 102 through the bevels 202. In other words, the bevels 202, which are configured to receive and hold, in part, the upper 104, are positioned along the midsole 120 where an upper 104 is desired. While the midsole portion 120 of the example platform 102 is an open toed shoe, in embodiments with closed toed shoes, the bevel 202 extends around the front portion of the midsole 120. Further, in embodiments with a complete upper 104 (e.g., sneaker, boot, etc.) the bevel 202 extends around substantially all of the midsole 120. The length and width of the footbed adjust the dimensions of the internal channels accordingly.

The center channel portion 350 is positioned between the upper loop portion 330 and the lower loop portion 320. In other words, the center channel portion 350 is the intersection of the upper loop portion 330 and the lower loop portion 320. The center channel portion 350 is adjacent to the window cavity 210 defined in the midsole 120 and provides access to the string 110 as it is inserted through the internal channels when the upper 104 is assembled onto the midsole portion 120 of the platform 102.

Turning to FIGS. 3A and 3C, the bevels 202 are positioned along the sides of the midsole 120 portion of the platform 102 where the upper 104 will be positioned. The bevels 202 include a first bevel side 312 (e.g., outstep side, left side of the left shoe, etc.) and a second bevel side 302 (e.g., instep side, right side of the right shoe, etc.) (FIG. 3C) positioned opposite of the first bevel side 312. As shown in FIG. 3C, the first bevel side 312 is in communication with the second bevel side 302 through the internal channel 150.

The first bevel side 312 includes an upper first bevel portion 314 and a lower first bevel portion 316. As shown in FIG. 3A, the upper first bevel portion 314 is angled and extends along the middle portion 132 between the lower portion 134 toward the upper portion 130. The lower first bevel portion 316 is substantially flat along the lower portion 134. In some embodiments, the upper first bevel portion 314 and the lower first bevel portion 316 are substantially flat to define a substantially flat (e.g., no angle) first bevel side 312. The upper first bevel portion 314 gives access to and is adjacent with the first upper side portion 334 of the upper loop portion 330. The lower first bevel portion 316 gives access to and is adjacent with the first lower side portion 324 of the lower loop portion 320.

The second bevel side 302 includes an upper second bevel portion 304 and a lower second bevel portion 306. The upper second bevel portion 304 is angled and extends along the middle portion 132 between the lower portion 134 toward the upper portion 130. The lower first bevel portion 306 is substantially flat along the lower portion 134. In some embodiments, the upper second bevel portion 304 and the lower second bevel portion 306 are substantially flat to define a substantially flat (e.g., no angle) second bevel side 302. In various aspects, the angle of the upper second bevel portion 304 may vary according to the material, fit, and/or size of the upper 104. The second bevel portion 304 gives access to and is adjacent with the second upper side portion 332 of the upper loop portion 330. The lower second bevel portion 306 gives access to and is adjacent with the second lower side portion 322 of the lower loop portion 320.

Figure 4:
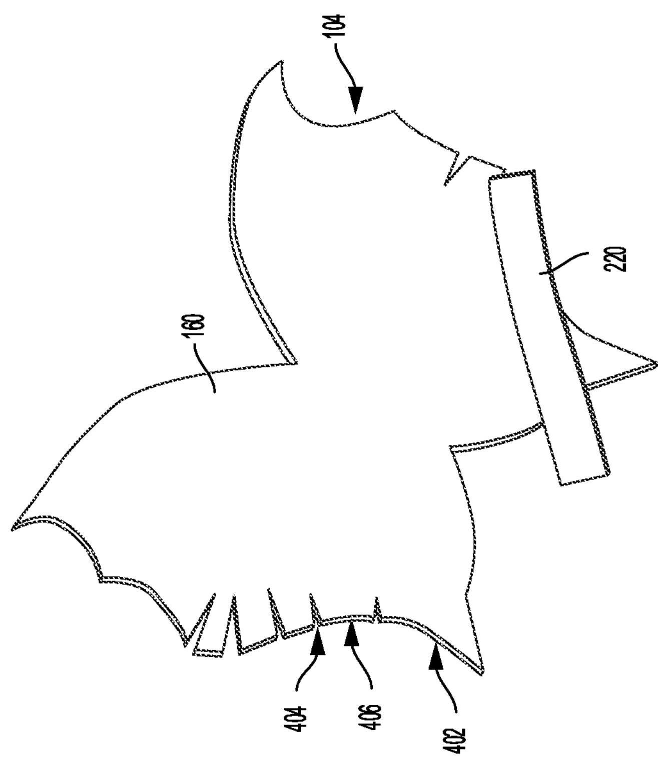
FIG. 4 illustrates an upper of the shoe of FIG. 2A without a binder, according to an example embodiment of the present application.

Referring to FIG. 4, an upper 104 of the shoe 100 of FIG. 2A is shown without a binder 220, according to an example embodiment. The upper 104 is a fabric that is cut to define the upper 104. The upper 104 includes a pattern 402 that is defined by a plurality of cuts 404 and a plurality of tabs 406. The plurality of cuts 404 and the plurality of tabs 406 are configured to allow the proper fit and form around the radial bends of the upper and lower loop portions 330 and 320 of the internal channel 150. The upper pattern allowance has several cuts in the plurality of cuts 404 made into that upper 104 material before a binder is sewn onto the internal surface 160 of the upper 104 to create room for the string channels.

Figure 5:
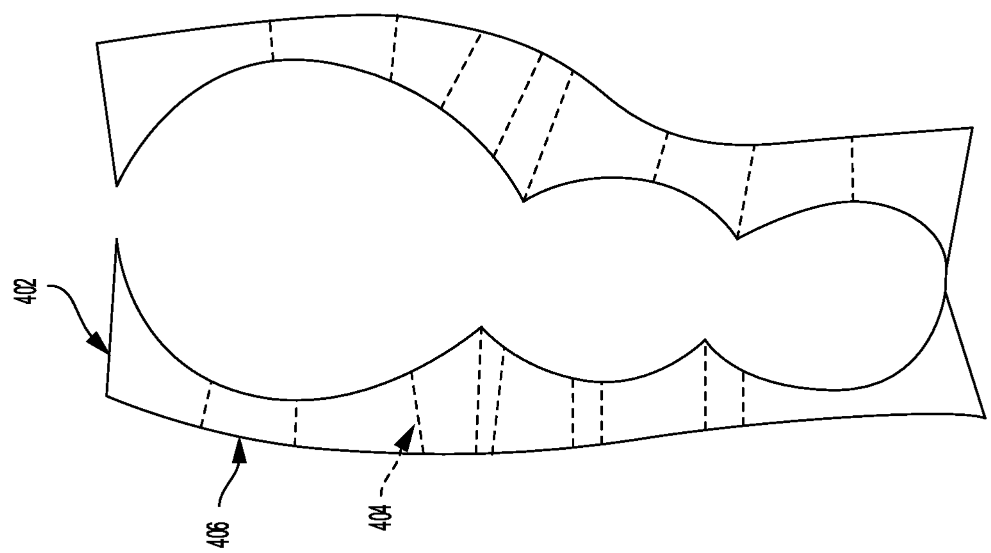
FIG. 5 illustrates a perspective view of a pattern and depth of slots for an upper, according to an example embodiment of the present application.

Turning to FIG. 5, a perspective view of an example pattern 402 and depth of slots for an upper 104 is shown, according to an example embodiment. In one aspect, the pattern 402, and the plurality of cuts 404 and tabs 406, are prepared with an allowance equivalent to the depth of the slots. Beneficially, the use of a cut and sewn upper allowance allows for proper integration of the upper 104 within the midsole portion 120 of the platform 102. In other aspects, the upper 104 may have other suitable patterns than that shown.

As described in the background section, sock liners are traditionally wrapped around the uppermost layer of lining material of the sole of footwear. Because the platform 102 is 3D printed as a single-material construction rather than a traditional layered construction, however, there is no uppermost layer for a sock liner to be wrapped around. Accordingly, the platform 102 is structured such that a sock liner may be assembled with the platform 102 without the traditional wrapping.

Figure 6:
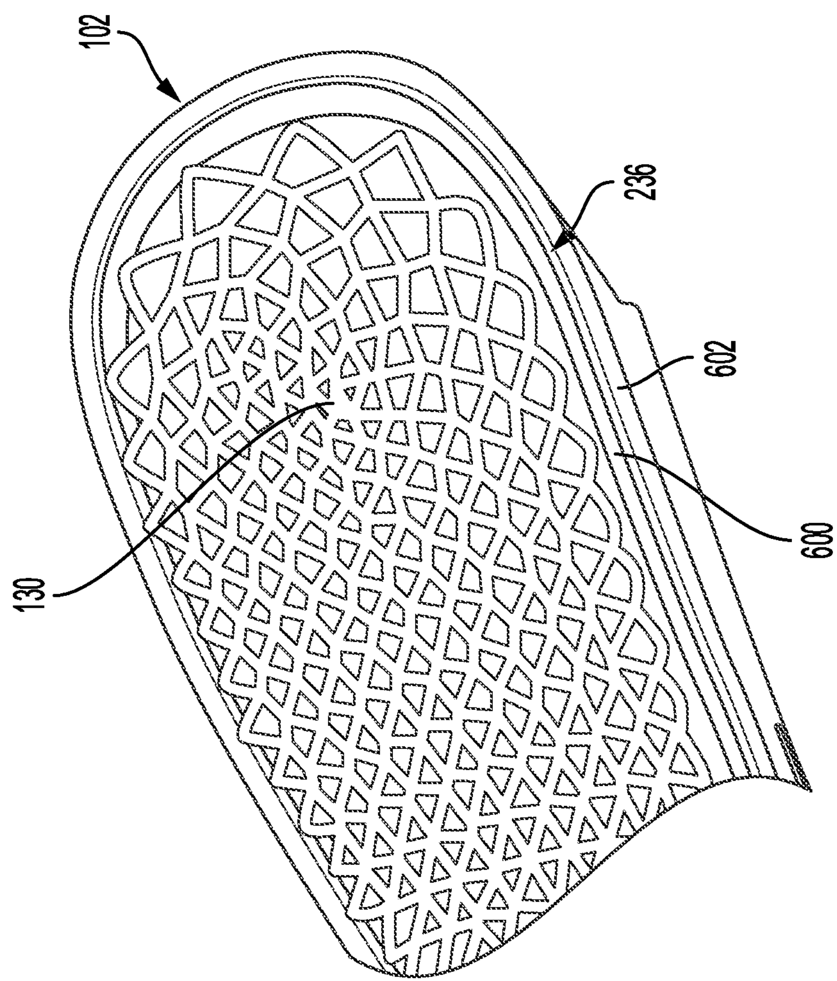
FIG. 6 illustrates a magnified perspective view of the platform of the shoe of FIG. 2B showing the slot within the platform that extends around the platform, according to an example embodiment of the present application.
Figure 7:
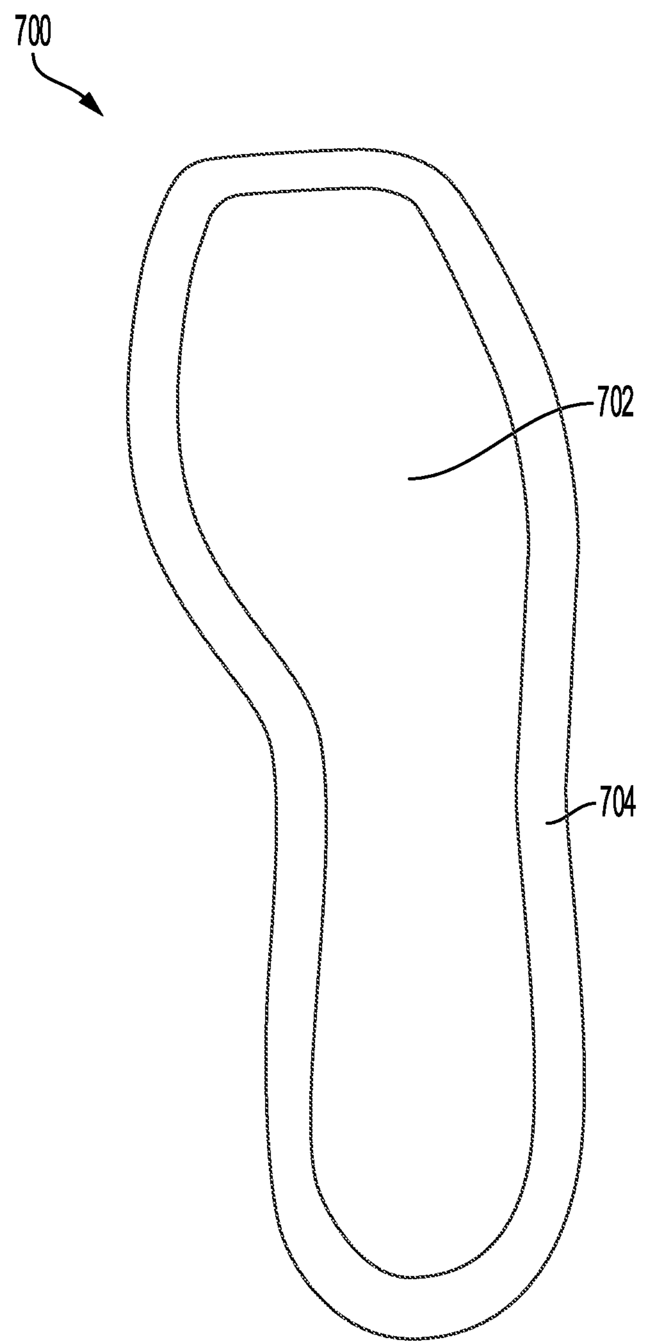
FIG. 7 illustrates a sock liner, according to an example embodiment of the present application.
Figure 8:
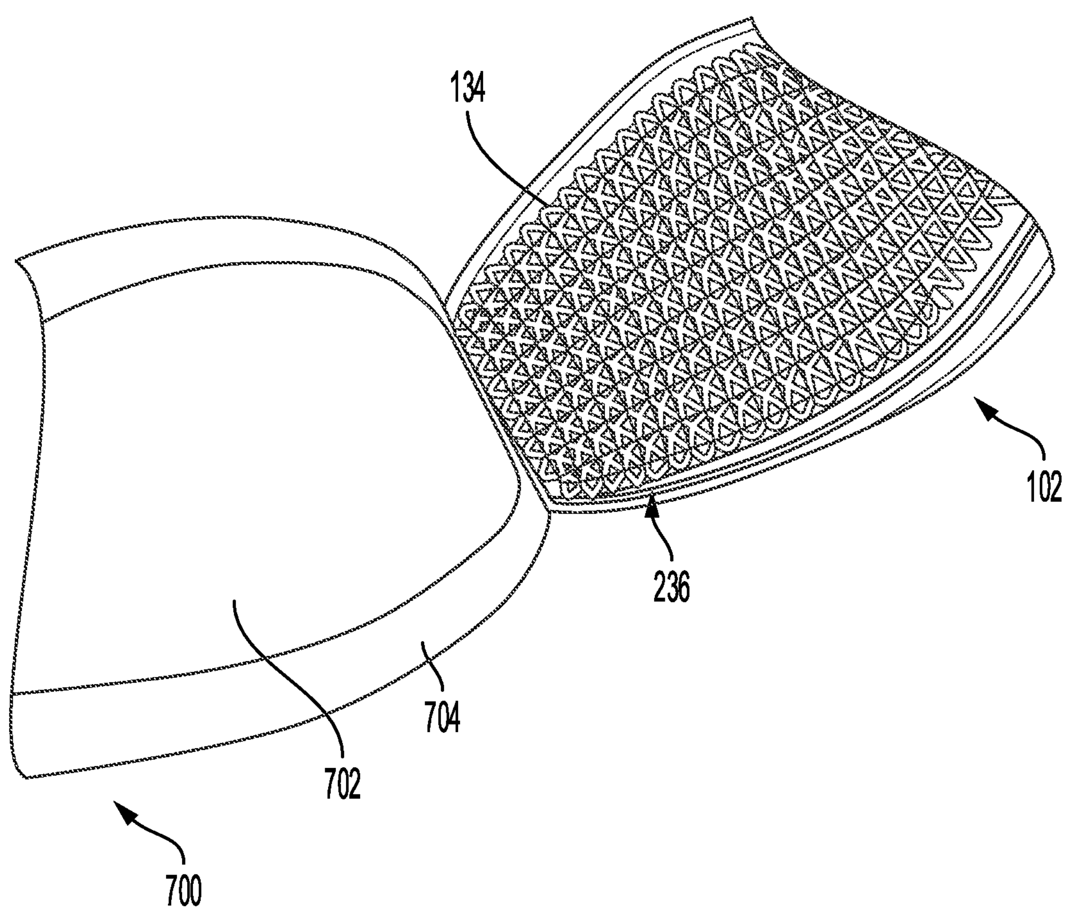
FIG. 8 illustrates a perspective view of a portion of the edge of the sock liner of FIG. 7 inserted within the slot of the platform of the shoe of FIG. 2B, according to an example embodiment of the present application.

FIG. 6 illustrates a magnified view of the platform 102 showing the slot 236 that extends around the platform 102 at an outer perimeter of the platform 102. The slot 236 is an opening between an inner edge 600 and an outermost edge 602 of the platform 102 that extends into the platform 102 (e.g., towards the ground side 214). FIG. 7 illustrates a sock liner 700 that includes a central portion 702 and an edge portion 704. The edge portion 704 may be inserted fully within the slot 236. As such, the slot 236 may be sized to receive the edge portion 704. For instance, FIG. 8 illustrates the edge portion 704 of the sock liner 700 being inserted within the slot 236 as the sock liner 700 is assembled with the platform 102. The edge portion 704 of the entire sock liner 700 may be inserted into the slot 236 in this way to assemble the sock liner 700 to the platform 102.

Figure 9:
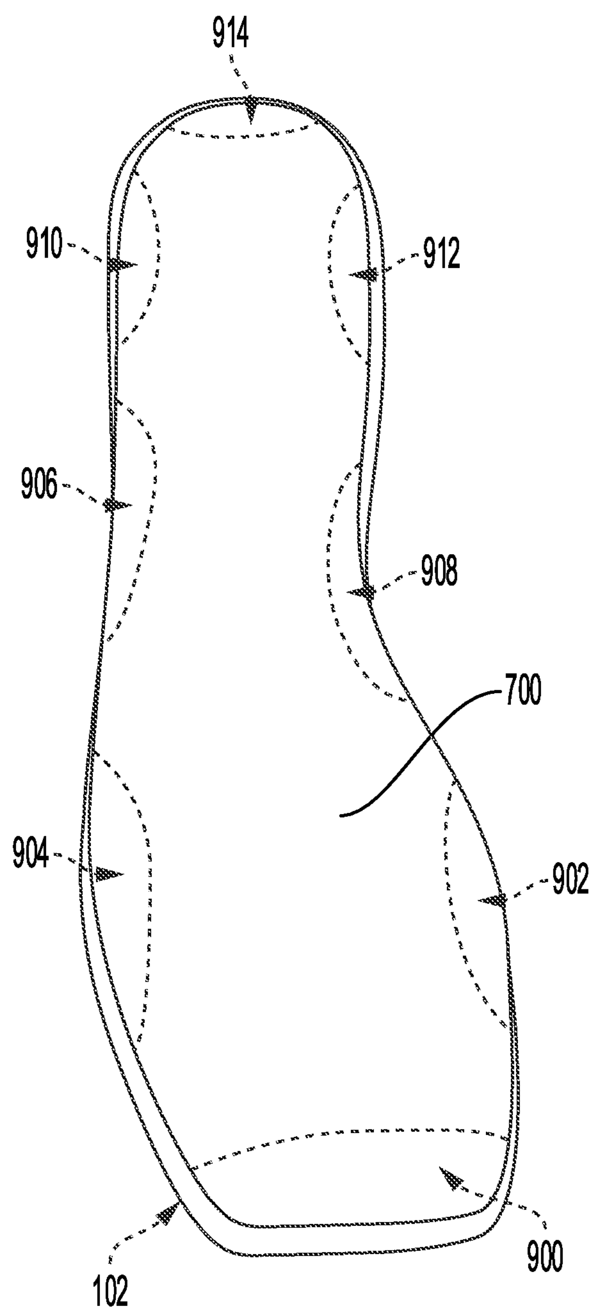
FIG. 9 illustrates the sock liner of FIG. 7 installed on the platform of the shoe of FIG. 2B, according to an example embodiment of the present application.

The edge portion 704 may be secured to the platform 102 within the slot 236, such as with bonding, glue, ultrasonic welding, or other suitable bonding methods. For example, bonding or glue may be applied within the slot 236 prior to inserting the edge portion 704 of the sock liner. FIG. 9 illustrates a sock liner 700 assembled with the platform 102 including bonds 900-914 that secure the sock liner 700 to the platform 102. For instance, bonding, glue, ultrasonic welding, etc. may be applied at each of the bonds 900-914. In an example, the edge portion 704 of the sock liner 700 may be inserted into the slot 236 such that the edge portion 704 is bonded to the platform 102 first at the bond 900, then at the bond 902, then at the bond 904, then at the bond 906, then at the bond 908, then at the bond 910, then at the bond 912, and then at the bond 914.

In at least some aspects, the sock liner 700 is patterned in a way that enables the sock liner 700 to fold around the curvatures of the footbed with the edge portion 704 inserted within the slot 236. The patterning of the sock liner 700 may correspond to the material of which the sock liner 700 is constructed. For instance, the sock liner 700 is patterned such that the sock liner 700 can fold around the curvatures of the footbed without creasing while creating enough surface area to firmly adhere to the platform 102. In some instances, patterning the sock liner 700 may include adjusting the thickness of the sock liner 700 in various portions of the sock liner 700. In some instances, patterning the sock liner 700 may include adjusting the shape of the clearance edges (e.g., the edge portion 704) to be bonded. The sock liner 700 may be constructed of various suitable materials for footwear such as leather, different fabrics and textiles and/or synthetic materials.

Figure 11:
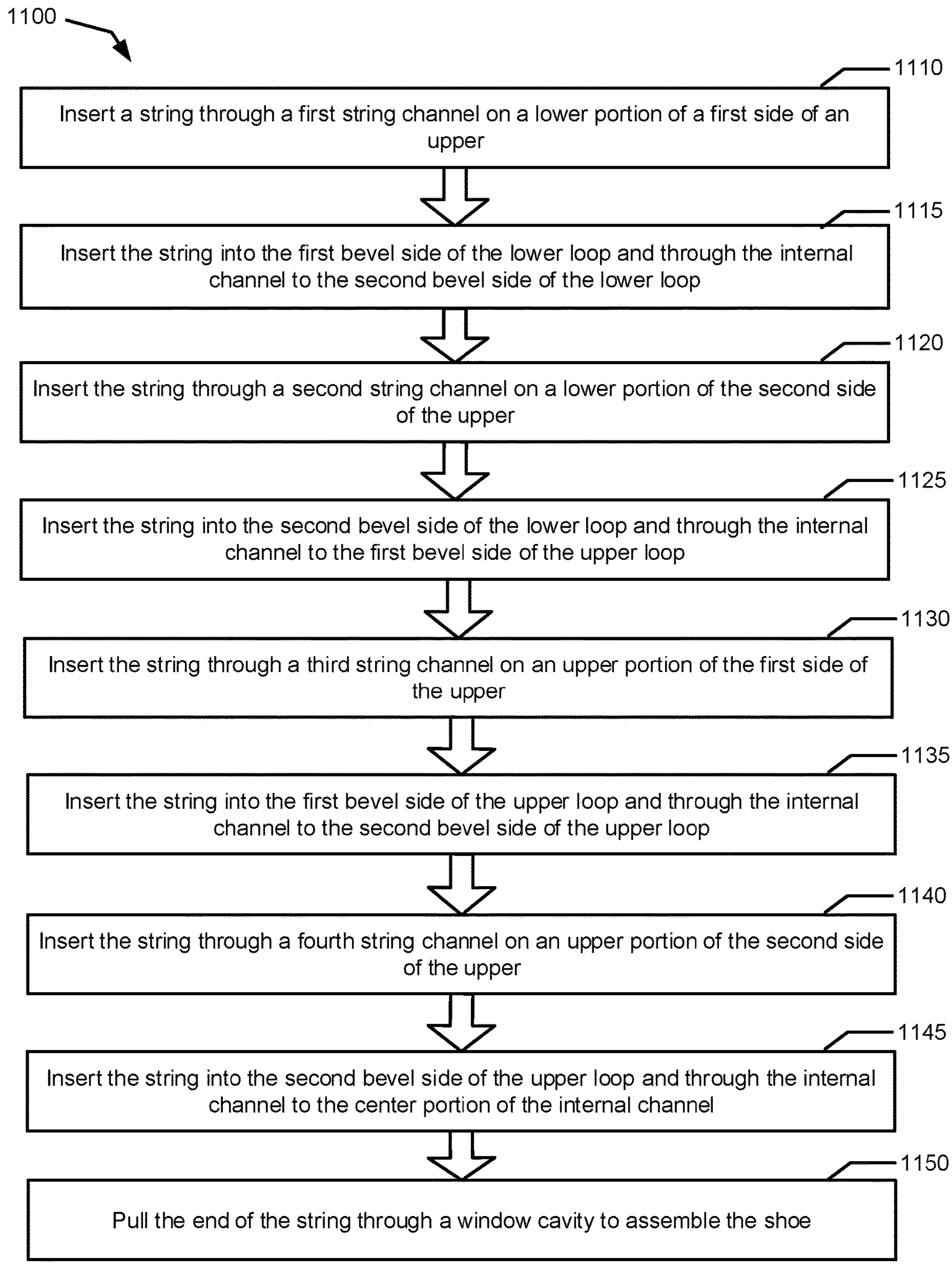
FIG. 11 is a flow diagram illustrating a method of string lasting an upper and a 3D printed platform, according to an example embodiment.

FIG. 11 illustrates a flow diagram of an example method 1100 of assembling a shoe (e.g., the shoe 100). For instance, the example method 1100 may include installing a sock liner with a 3D printed platform (e.g., the platform 102). In another instance, the example method 1100 may include string lasting an upper (e.g., the upper 104) and a midsole portion (e.g., the midsole portion 120) of a 3D printed platform (e.g., the platform 102) to assemble the shoe 100, according to an example embodiment. The upper may be string lasted to a 3D printed platform having a sock liner already installed. Although the examples below are described with reference to the flowchart illustrated in FIG. 11, many other methods of performing the acts associated with FIG. 11 may be used. For example, the order of some of the blocks may be changed, certain blocks may be combined with other blocks, one or more of the blocks may be repeated, and some of the blocks described may be optional.

Prior to the method 1100, the platform 102 is 3D printed to define a single unit of the midsole 120 having an internal channel 150 and the heel 122. In some embodiments, the platform is 3D printed with just a midsole having an internal channel 150 (e.g., without the heel 122). The platform 102 includes an internal channel 150 and bevels 202 for receiving the upper 104. The upper 104 is cut with a pattern (e.g., the pattern 402) and a plurality string channels (e.g., the string channels 222, 224, 226, and 228). The first string channel 226 and the second string channel 228 are positioned on a lower side (e.g., positioned closer to the toe portion than the heel) of the upper 104 and the third string channel 222 and the fourth string channel 224 are positioned on an upper side (e.g., positioned closer to the heel than the toe portion) of the upper 104.

At 1110, the example method 1100 may begin by inserting a string 110 through the first string channel 226 on the lower portion of a first side of the upper 104. In some embodiments, the string 110 may be inserted through the back (e.g., heel facing) of the first string channel 226, pulled through the length of the first string channel 226, and out of the front (e.g., toe facing) of the first string channel 226. In other embodiments, the string 110 may be inserted through the front end and out of the back end of the first string channel 226.

At 1115, the string 110 is inserted through the first side of the bevel 312 of the lower loop (e.g., the lower loop portion 320) through the internal channel 150 to the second side of the bevel 302 of the lower loop portion 320. Specifically, the string 110 is inserted into the lower first bevel 316 of the first bevel 312 and pulled through the first lower side portion 324 toward the second lower side portion 322 and out of the lower second bevel 306 of the second bevel 302. In various embodiments, the path of the string 110 may travel along different portions of the internal channel and to different string channels of the upper 104.

At 1120, the string 110 is inserted through the second string channel 228 on the lower portion of a second side of the upper 104. The string 110 may be inserted through the front (e.g., toe facing) of the second string channel 228, pulled through the length of the second string channel 228, and out of the back (e.g., heel facing) of the second string channel 228. In other embodiments, the string 110 may be inserted through the back end and front end of the second string channel 228.

At 1125, the string 110 is inserted through the second side of the bevel 302 of the lower loop portion 320 through the internal channel 150 to the first side of the bevel 302 of the upper loop (e.g., the upper loop portion 330). Specifically, the string 110 is inserted into the lower second bevel 306 of the second bevel 302 and pulled through the second lower side portion 322 toward the first upper side portion 334 passing by the center channel portion 350. The string 110 is pulled out of the upper first bevel 314 of the first bevel 312. At the conclusion of block 1125, the string 110 is visible in the center channel portion 350 through the window cavity 210. In some embodiments, the path of the string 110 may travel along different portions of the internal channel and to different string channels of the upper 104.

At 1130, the string 110 is inserted through the third string channel 222 on the upper portion of the first side of the upper 104. The string 110 may be inserted through the front (e.g., toe facing) of the third string channel 222, pulled through the length of the third string channel 222, and out of the back (e.g., heel facing) of the third string channel 222. In other embodiments, the string 110 may be inserted through the back end and front end of the third string channel 222.

At 1135, the string 110 is inserted through the first side of the bevel 312 of the upper loop portion 330 through the internal channel 150 to the second side of the bevel 302 of the upper loop portion 330. Specifically, the string 110 is inserted into the upper first bevel 314 of the first bevel 312 and pulled through the first upper side portion 334 toward the second upper side portion 332 and out of the upper second bevel 304 of the second bevel 302. In some embodiments, the path of the string 110 may travel along different portions of the internal channel and to different string channels of the upper 104.

At 1140, the string 110 is inserted through the fourth string channel 224 on the upper portion of the second side of the upper 104. The string 110 may be inserted through the back (e.g., heel facing) of the fourth string channel 224, pulled through the length of the fourth string channel 224, and out of the front (e.g., toe facing) of the fourth string channel 224. In other embodiments, the string 110 may be inserted through the front end and out of the back end of the fourth string channel 224.

At 1145, the string 110 is inserted through the second side of the bevel 302 of the upper loop portion 330 through the internal channel 150 to the center channel portion 350. Specifically, the string 110 is inserted into the upper second bevel 304 of the second bevel 302 and pulled through the second upper side portion 332 toward the center channel portion 350. The string 110 is pulled out of the center channel portion 350. At the conclusion of block 1145, two parts of the string 110, including the end of the string 110, are visible in the center channel portion 350 through the window cavity 210. In some embodiments, the path of the string 110 may travel along different portions of the internal channel and to different string channels of the upper 104.

At 1150, the end of the string 110 positioned in the center channel portion 350 is pulled through the window cavity 210 to assemble the upper 104 with the midsole portion 120 of the platform 102. In parallel with, or before, pulling the end of the string 110 through the window cavity 210, the cuts and pattern ends of the upper 104 are properly positioned (e.g., oriented) within the radial slots of the bevels 202 and/or exterior portions of the internal channel 150 to allow for the upper 104 to properly assemble with the midsole portion 120 of the midsole portion 120 of the platform 102. The end of the string 110 is pulled until the upper 104 is firmly, and properly, positioned within the midsole portion 120 of the platform 102. The end of the string 110 may be secured before a window plug 232 is inserted into the window cavity 210 to protect the string 110 in the internal channel 150. For example, the end of the string 110 is tied in a knot and trimmed to complete the assembly. Beneficially, the use of an internal channel 150 to effect string lasting as described in the method 1100 does not require additional layering, such as an outsole.

Figure 10:
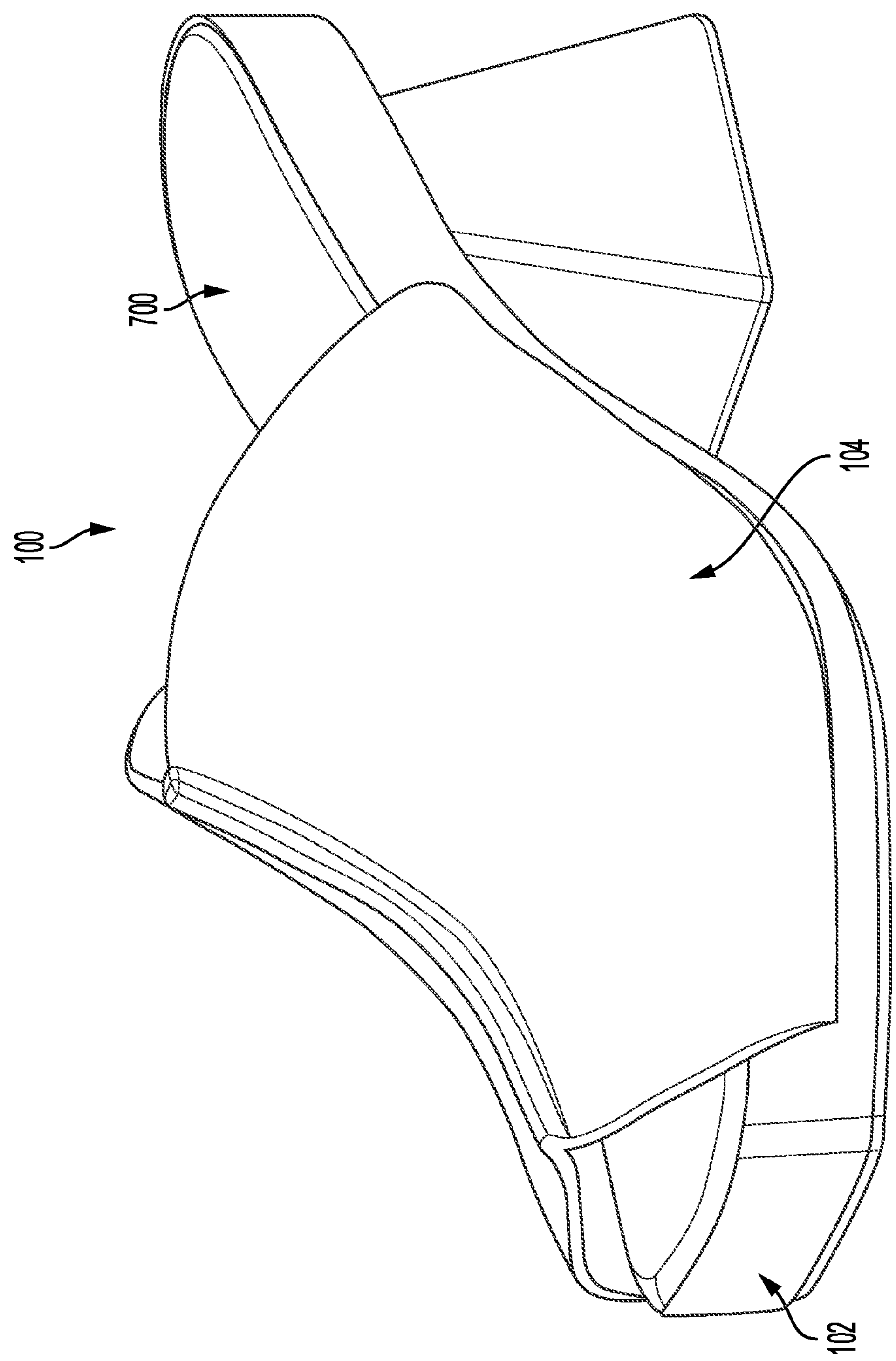
FIG. 10 illustrates a perspective view of the shoe of FIG. 1 having an installed sock liner and an installed upper, according to an example embodiment of the present application.

In some aspects, the example method 1100 may include inserting an edge portion (e.g., the edge portion 702) of a sock liner (e.g., the sock liner 700) into a slot (e.g., the slot 236) of the platform 102 to thereby assemble the sock liner 700 with the platform 102. In at least one example, the edge portion 702 may be inserted into the slot 236 prior to block 1110 of the example method 1100. Stated differently, the sock liner 700 may be assembled with the platform 102 prior to assembling the upper 104 with the platform 102. As described above, the edge portion 702 of the sock liner 700 may be secured to the platform 102 with bonding, glue, ultrasonic welding, or other suitable boding methods, which at least in some aspects, may be applied to the slot 236 prior to inserting the edge portion 702 into the slot 236. In at least one example, the edge portion 702 may be inserted into the slot 236, and secured (e.g., bonded) with the platform 102, in the example order provided above with respect to the bonds 900-914. FIG. 10 illustrates a perspective view of the shoe 100 including the platform 102 assembled with the sock liner 700 and the upper 104.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

As used herein and in the appended claims, the singular form of a word includes the plural, unless the context clearly dictates otherwise. Thus, the references "a," "an" and "the" are generally inclusive of the plurals of the respective terms. For example, reference to "a feature" includes a plurality of such "features." The term "and/or" used in the context of "X and/or Y" should be interpreted as "X," or "Y," or "X and Y.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A shoe comprising:

a fastener;

an upper comprising a first upper side, a second upper side opposite the first upper side, and a plurality of fastener channels configured to receive the fastener; and a platform comprising:

a first surface configured to support a user foot, a second surface opposite of the first surface, a first side portion extending between the first surface and the second surface, a second side portion extending between the first surface and the second surface, the second side portion opposite the first side portion, a first bevel defined in the first side portion and configured to receive a portion of the first upper side of the upper, a second bevel defined in the second side portion and configured to receive a portion of the second upper side of the upper, and an internal channel positioned between and internal of the first surface and the second surface and between the first and second side portions, wherein the internal channel forms a loop-shaped path that extends between the first bevel and the second bevel and between the first and second side portions, wherein at least a portion of each of the first bevel and the second bevel provides access openings to the loop-shaped path of the internal channel, the internal channel is configured to receive the fastener to assemble the upper with the platform with the portion of the first upper side fastened in the first bevel and the portion of the second upper side fastened in the second bevel, wherein the platform includes a cavity sized to store the fastener when the upper is assembled with the platform.

2. The shoe of claim 1, wherein the upper includes a plurality of cuts forming a plurality of tabs.

3. The shoe of claim 1, wherein when the upper is assembled with the platform, the upper and the platform are held together with only the fastener.

4. The shoe of claim 1, wherein the platform includes a slot that extends around the platform at an outer perimeter of the platform.

5. The shoe of claim 1, further comprising a sock liner.

6. The shoe of claim 1, wherein the platform comprises a heel portion and a midsole portion formed as a single unit with the heel portion.

7. The shoe of claim 1, A shoe comprising:

a fastener;

an upper comprising a first upper side, a second upper side opposite the first upper side, and a plurality of fastener channels configured to receive the fastener; and a platform comprising:

a first surface configured to support a user foot, a second surface opposite of the first surface, a first side portion extending between the first surface and the second surface, a second side portion extending between the first surface and the second surface, the second side portion opposite the first side portion, a first bevel defined in the first side portion and configured to receive a portion of the first upper side of the upper, a second bevel defined in the second side portion and configured to receive a portion of the second upper side of the upper, and an internal channel positioned between and internal of the first surface and the second surface and between the first and second side portions, wherein the internal channel forms a loop-shaped path that extends between the first bevel and the second bevel and between the first and second side portions, wherein at least a portion of each of the first bevel and the second bevel provides access openings to the loop-shaped path of the internal channel, the internal channel is configured to receive the fastener to assemble the upper with the platform with the portion of the first upper side fastened in the first bevel and the portion of the second upper side fastened in the second bevel, wherein the internal channel extends along a figure eight shape.

8. The shoe of claim 1, A shoe comprising:

a fastener;

an upper comprising a first upper side, a second upper side opposite the first upper side, and a plurality of fastener channels configured to receive the fastener; and a platform comprising:

a first surface configured to support a user foot, a second surface opposite of the first surface, a first side portion extending between the first surface and the second surface, a second side portion extending between the first surface and the second surface, the second side portion opposite the first side portion, a first bevel defined in the first side portion and configured to receive a portion of the first upper side of the upper, a second bevel defined in the second side portion and configured to receive a portion of the second upper side of the upper, and an internal channel positioned between and internal of the first surface and the second surface and between the first and second side portions, wherein the internal channel forms a loop-shaped path that extends between the first bevel and the second bevel and between the first and second side portions, wherein at least a portion of each of the first bevel and the second bevel provides access openings to the loop-shaped path of the internal channel, the internal channel is configured to receive the fastener to assemble the upper with the platform with the portion of the first upper side fastened in the first bevel and the portion of the second upper side fastened in the second bevel;

wherein the loop portion comprises a first loop portion, wherein the internal channel further includes a second loop portion, wherein the first loop portion is located near a toe portion of the platform.

9. The shoe of claim 8, wherein a first portion of each of the first bevel and the second bevel provide access to the first loop portion of the internal channel, and wherein a second portion of each of the first bevel and the second bevel provide access to the second loop portion of the internal channel.

10. The shoe of claim 8, wherein the first loop portion and the second loop portion are joined by a central channel portion through which the fastener can extend between the first loop portion and the second loop portion.

11. The shoe of claim 10, wherein a cavity in the platform allows access to the central loop portion from exterior to the platform.

12. The shoe of claim 1, wherein the platform is 3D printed.

13. The shoe of claim 1, wherein the first surface includes material formed in a lattice structure.

14. A shoe comprising:

a fastener;

an upper comprising a first upper side, a second upper side opposite the first upper side, and a plurality of fastener channels configured to receive the fastener; and a platform comprising:

a first surface configured to support a user foot, a second surface opposite of the first surface, a first side portion extending between the first surface and the second surface, a second side portion extending between the first surface and the second surface, the second side portion opposite the first side portion, a first bevel defined in the first side portion and configured to receive a portion of the first upper side of the upper, a second bevel defined in the second side portion and configured to receive a portion of the second upper side of the upper, an internal channel positioned between and internal of the first surface and the second surface and between the first and second side portions, wherein the internal channel forms a loop-shaped path that extends between the first bevel and the second bevel and between the first and second side portions, wherein at least a portion of each of the first bevel and the second bevel provides access openings to the loop-shaped path of the internal channel, the internal channel is configured to receive the fastener to assemble the upper with the platform with the portion of the first upper side fastened in the first bevel and the portion of the second upper side fastened in the second bevel; and a sock liner;

wherein the platform comprises a slot extending around the platform at an outer perimeter of the platform, wherein an edge portion of the sock liner is retained within a slot of the platform.

15. The shoe of claim 14 wherein the edge portion of the sock liner is bonded to the platform within the slot.

16. The shoe of claim 1, wherein the fastener comprises a string configured to extend along the internal channel.

17. The shoe of claim 1, wherein the loop portion extends along the first surface and the second surface.

* * * * *